June 4, 1957  J. H. RAUTH  2,794,412
INDICATING APPARATUS AND MEANS FOR MOUNTING DIALS THEREIN
Filed May 27, 1955  2 Sheets-Sheet 1
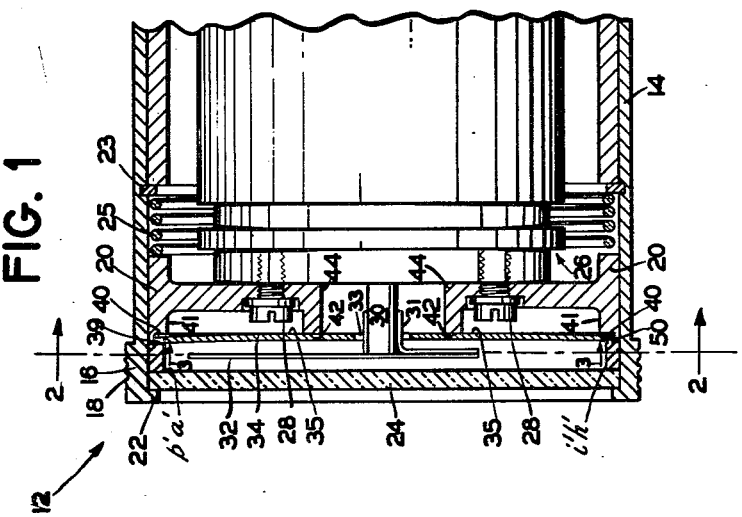
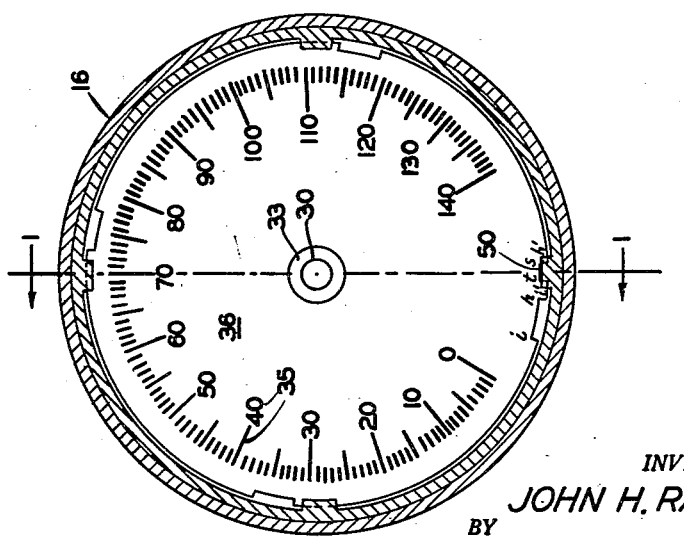
INVENTOR.
JOHN H. RAUTH
BY
Tyler & Roundy
ATTORNEY June 4, 1957 J. H. RAUTH 2,794,412
INDICATING APPARATUS AND MEANS FOR MOUNTING DIALS THEREIN
Filed May 27, 1955 2 Sheets-Sheet 2
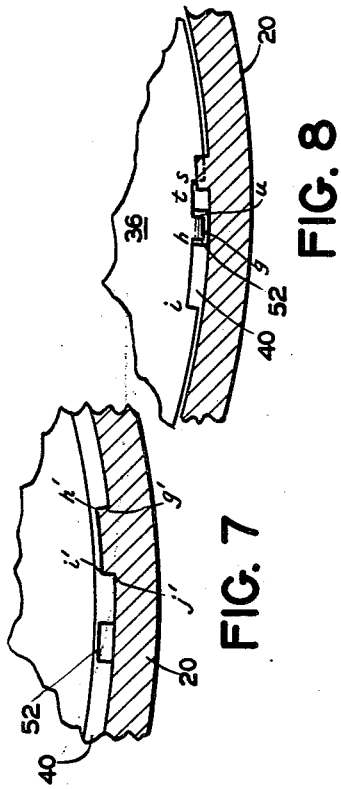
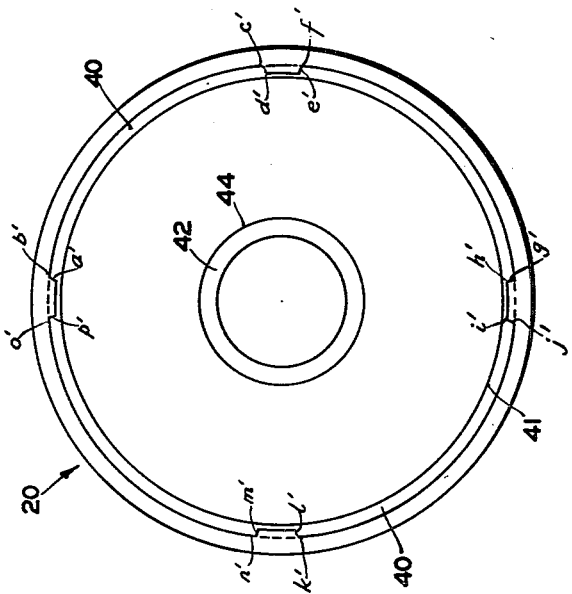
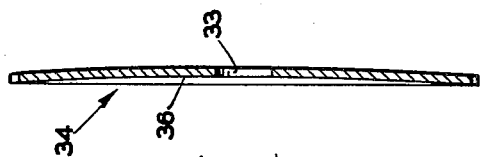
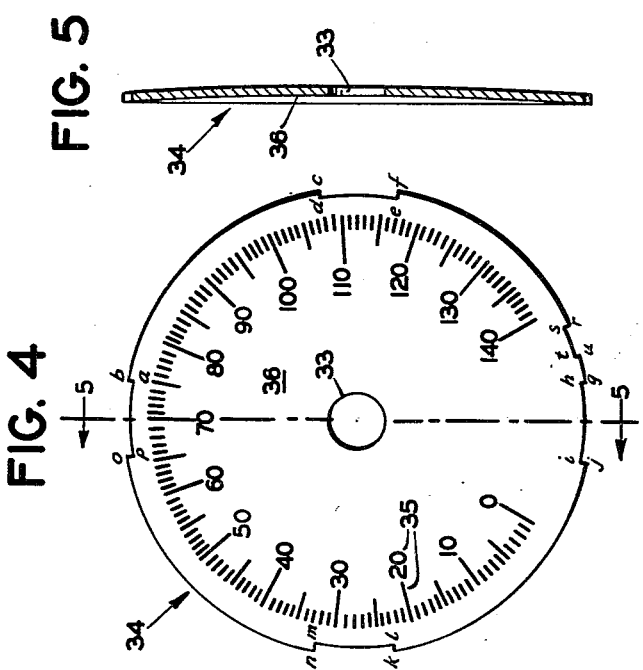
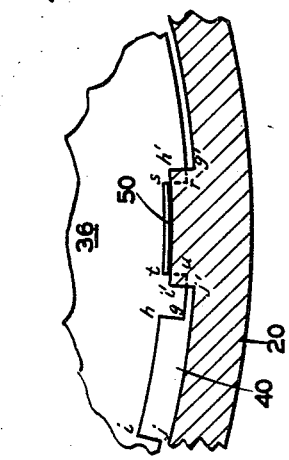
INVENTOR.
JOHN H. RAUTH
BY
Tyler S Roundy
ATTORNEY

United States Patent Office 2,794,412
Patented June 4, 1957

2,794,412
INDICATING APPARATUS AND MEANS FOR MOUNTING DIALS THEREIN

John H. Rauth, Maywood, N. J., assignor to Bendix Aviation Corporation, Teterboro, N. J., a corporation of Delaware Application May 27, 1955, Serial No. 511,672

8 Claims. (Cl. 116—129)

This invention relates to indicating apparatus and particularly to a method and means for mounting a dial in indicating apparatus.

Heretofore, in indicating apparatus wherein an actuating device turns an indicator element or pointer with respect to graduations or other indicia on an associated dial, the particular method of mounting the dial in the assembly has created certain problems because of the need for conserving dial space due to space limitations dictated by overall design requirements and has created problems from the standpoint of the manufacture and maintenance of the indicating apparatus.

In conventional arrangements the dial is secured to a support structure by screws or similar mechanical fastening aids. However, the holes for such fasteners take up valuable space on a dial surface which is already overcrowded with lettering and one or more graduated scales plus symbols and other indicia. The use of such fasteners requires supplemental manufacturing operations such as the tapping of holes in the dial plate and the dial-support structure, thereby increasing manufacturing costs. Since the clearance distance between pointer and dial must be small in order to minimize parallax error, dial-mounting screws are required to be of a special relatively expensive type having a head with low height so as not to obstruct the pointer. Moreover, the slot in the head of the screw is frequently chewed up or distorted by the screw-driver during assembly. Also, in applications such as aircraft installations, the dial-mounting screws work themselves loose when exposed to excessive vibration.

It is an object of the present invention to provide improved indicating apparatus.

It is another object of the invention to provide a novel method and means for mounting a dial in an indicating instrument without the aid of dial-mounting screws or similar fastening devices.

It is another object of the invention to provide an improved dial and an improved dial-support structure.

It is another object of the invention to provide means for releasably supporting a dial in indicating apparatus so that the dial may be removed simply by rotation through a predetermined number of degrees.

It is another object of the invention to provide a dial-support means wherein the dial is mounted in position simply by rotation through a predetermined number of degrees, means being provided for locking the dial in place after such rotation.

The above and other objects and features of the present invention will become apparent hereinafter from a consideration of the detailed description which follows taken together with the accompanying drawings wherein one embodiment of the invention is illustrated by way of example. In the drawings wherein like reference characters refer to like elements throughout the several views, Fig. 1 is a cross-sectional side elevation view of indicating apparatus in accordance with the invention taken along the line 1—1 of Fig. 2;

Fig. 2 is a cross-sectional front view taken along the line 2—2 of Fig. 1;

Fig. 3 is a front view of the dial-support member taken along the line 3—3 of Fig. 1 with the pointer and dial omitted;

Figs. 4 and 5 are front and cross-sectional side elevation views, respectively, of the dial of Figs. 1 and 2;

Fig. 6 is an enlargement of a portion of Fig. 2 to illustrate how material from a projection of the dial-support structure may serve to lock the dial; and Figs. 7 and 8 are similar enlargements of a dial-support structure alone and in combination with a dial, respectively, illustrating how a dial projection may serve to lock the dial.

Turning to Figs. 1 and 2 there is shown generally at 12 an indicating instrument including a housing or casing 14 having an enlarged front portion 16 which may be mounted in a panel (not shown). Fitted snugly within the inner wall of the casing is a support structure 20 which serves as a support for a dial 34 to be described in greater detail hereinafter. The structure 20 also serves with screws 28 as a support for an electro-mechanical device 26 which may be an inductive synchro follow-up device, a servomotor, or an ammeter or voltmeter for example.

Sandwiched between an annular flange portion 22 of the casing and the front portion of the support structure 20 is a cover glass 24. Suitable means such as a compression spring 25 may be employed to prevent axial shift of the support structure 20 inside the casing. Mounted rigidly on the shaft 30 of the follow-up device 26 is a sleeve 31 which passes centrally through an aperture 33 in the dial and carries a pointer 32. Upon suitable electrical excitation of device 26 the shaft is angularly displaced to move the pointer relative to the indicia 35 which are painted or engraved on the front surface 36 of dial 34.

As seen best in Figs. 4 and 5, the dial 34 is preferably a thin resilient metal disc which is relatively stiff and has in its free unstressed condition, before mounting in the instrument, a concave shape so that the front dial surface 36 bows in slightly away from the observer. This concave shape may be obtained, for example, by placing a flat metal disc in a suitable forming die to give the desired curvature. In one construction which has proved satisfactory the dial was formed from 0.025 inch aluminum alloy stock, the unstressed concave disc having an overall height of 0.040 inch and an outside diameter of 1.79 inches. The aluminum alloy employed contained the following approximate percentages: aluminum 98.6%, iron plus silicon 1.0%, copper 0.2%, manganese 0.1% and zinc 0.1%.

Equally spaced apart along the circumference of the dial disc 34 and extending radially outward away from the central aperature 33 are four arcuate marginal portions or projections *abcd*, *efgh*, *ijkl* and *mnop*. These circumferential projections preferably have equal circumferential lengths and are equally spaced so as to define between adjacent projections the arcuate marginal slots *opab*, *cdef*, *ghij* and *klmn*. Preferably, disc 34 is also provided with a small fifth marginal slot *rstu* which is located close to slot *ghij*. In the specific construction referred to above where the disc had an outside diameter of 1.79 inches, the bases of the five marginal slots were indented approximately 0.03 inch radially inward from the outer circumference of the disc.

As shown in Figs. 1 and 3, the dial-support structure 20 has an outer annular shoulder 40 and has an inner annular surface 42 on the front end of a central annular projection 44 through which the shaft 30 passes, the surfaces 40 and 42 lying in the same plane. Equally spaced apart along the outer circumference of structure 20 and extending radially inward toward its central axis are four projections o'p'a'b', c'd'e'f', g'h'i'j', and k'l'm'n'. As shown in Fig. 3, these circumferential projections do not extend as far inward toward the central axis as does the inner edge 41 of the annular surface 40. As shown in Fig. 1, between surface 40 and the rear surface 39 of each of the projections of the structure 20 there is a groove to provide a clearance which is slightly greater than the thickness of the stock from which the dial disc is made. The inner circumferential edge of the annular surface 40 has a diameter which is less than the outside diameter of the unstressed dial disc 34. As shown in Fig. 2 the circumferential extent of the four principal slots in dial 34 is greateer than the circumferential extent of the four projections of the dial-support structure 20.

The method of mounting the dial in the instrument is as follows. With the pointer omitted from the shaft 30, the dial disc 34 is manually slipped over shaft 30 so that the central portion of the rear surface 35 of the dial disc rests against the annular surface 42 of structure 20, the four principal arcuate slots in the dial disc being placed in registration with respective of the inward projections of structure 20 so that the slots span the latter projections and the projections extend partially into the slots. With his hands or with a suitable tool such as a rigid tube faced with rubber at its working end, the assembler then exerts rearward pressure against the outer annular portion of the front surface 36 of the dial disc to straighten the disc out substantially thereby placing it under compression, and the assembler simultaneously rotates the dial disc sufficiently in a clockwise direction until the four principal projections of the disc are located, at least partially, behind respective of the four inward projections of structure 20. The disc is thus clamped under compression between the inward projections on the front side and the annular projection 44 on the rear side. The disc remains almost flat, the showing being somewhat exaggerated in Fig. 1. Such mounting may be sufficient in many applications.

However, in applications such as aircraft installations where the indicator may be exposed to severe vibration and similar influences, it is desirable to provide additional positive means for insuring that the dial is locked against angular shift in structure 20 due to vibration and the like. Accordingly, the auxiliary fifth slot rstu is provided in the dial disc 36, and during the above mounting operation the clockwise rotation is continued until the slot rstu is lined up substantially opposite the nearest inward projection of structure 20, which is projection g'h'i'j' as illustrated in Figs. 1 and 6. As illustrated best in Fig. 6, the rear inner portion of projections g'h'i'j' is then pricked-punched so as to depress some of its metal 50 into slot rstu, thereby staking or locking the dial positively against vibration or similar influences. If it is desired to remove or replace the dial, it is simply necessary to rotate the dial by hand or tool in a counterclockwise directiion with the relatively small amount of force necessary to shear the pricked-in metal 50.

Other suitable locking means may be employed. For example, in Fig. 7 the dial support structure 20 is provided with a small slot 52 in the annular surface 40 adjacent to the inward projection g'h'i'j' so that the small fifth projection lug may be employed as a stop tab or lug which is depressed at an angle into slot 52 when lined up with the slot as illustrated in Fig. 8.

Various modifications are possible within the purview of the present invention. For example, the dial disc may be composed of non-resilient opaque material or light-conducting material such as "Lucite" for providing indirect or "night-vision" type dial illumination, the dial being rotated with a friction fit into place between clamping surfaces of the support structure corresponding to the inward projections and annular surface 40. Also, while four inward projections for the support structure 20 and four outward projections for the dial have been described by way of example, it will be appreciated that a smaller number of support projections and dial projections may be employed if desired. Moreover, the dial-support structure may be integral with the housing if desired.

Although one specific embodiment of the invention has been illustrated and described in detail by way of example, it is to be expressly understood that the invention is not limited thereto. Various changes may be made in the shape, size and design of the dial and dial-support structure and associated elements without departing from the spirit and scope of the appended claims as will now be understood by those skilled in the art.

I claim:

1. For mounting in the support structure of an indicating apparatus of a type having stop portions; a dial comprising a disc-like element of resilient material, said element having an indicia-bearing surface portion which is initially concave before mounting in the support structure and which is deformable under stress to lie substantially in one plane when mounted in the support structure, said element having a plurality of circumferentially spaced projecting portions to engage said stop portions for retaining said dial in position when mounted on the support structure, and said element including means for engaging the support structure to fix said dial in position in the support structure.

2. For mounting in the support structure of an indicating apparatus of a type having stop portions; a dial comprising a disc-like element of resilient material, said element having an indicia-bearing surface portion which is initially concave before mounting in the support structure and which is deformable under stress to lie substantially in one plane when mounted in the support structure, said element having a plurality of circumferentially spaced projecting portions to engage said stop portions for retaining said dial in position when mounted on the support structure, and said element having a lug portion for engaging in the support structure to fix said dial in position in the support structure.

3. For mounting in the support structure of an indicating apparatus of a type having stop portions; a dial comprising a disc-like element of resilient material, said element having an indicia-bearing surface portion which is initially concave before mounting in the support structure and which is deformable under stress to lie substantially in one plane when mounted in the support structure, said element having a plurality of circumferentially spaced projecting portions to engage said stop portions for retaining said dial in position when mounted on the support structure, and said element having a slot for registration and engagement with one of said stop portions of the support structure to fix said dial in position in the support structure.

4. In indicating apparatus, the combination comprising a resilient disc-like dial structure, means for mounting the dial structure including comprising a support structure having a first portion for receiving the rear surface portion of the dial structure and having forward of said first portion and integral therewith at least one circumferential portion extending radially inward for engagement with the front surface of the resilient dial structure so that the dial structure may be compressed and clamped under the resilient force thereof between said first portion and said forward circumferential portion, and said dial structure having a circumferential slot for registration with said last-mentioned portion upon initially mounting the dial structure in the support structure.

5. In indicating apparatus, the combination comprising a resilient disc-like dial having an indicia bearing concave surface, means for mounting the disc-like dial, said dial including a plurality of circumferentially spaced radially projecting arcuate portions defining a plurality of arcuate slots therebetween, said mounting means including a support structure having a first circumferential portion for location behind the rear surfaces of the arcuate dial portions and having forward of said first portion and integral therewith a plurality of spaced circumferential portions extending radially inward for initial registration with respective of the arcuate dial slots, the circumferential extent of each of said forward circumferential portions being less than the circumferential extent of each of said arcuate dial slots to provide clearance therebetween when in registration, each of said forward circumferential portions being spaced from said first circumferential portion so that upon said concave disc-like dial being compressed against said first circumferential portion and upon angular rotation of the dial the arcuate projecting portions of the dial may be inserted between respective of said forward circumferential portions and said first circumferential portion and held therein by the resilient force of the disc-like dial, and said dial including means at the circumference thereof for engaging the support structure to fix said dial in an angularly adjusted position in the support structure.

6. In indicating apparatus, the combination comprising a resilient disc-like dial having an indicia bearing surface which is concave in its unstressed condition and a plurality of circumferentially spaced arcuate portions which project radially outward to define a plurality of arcuate slots therebetween, and means for mounting said dial including a support structure having an annular surface which engages the rear surface of said dial, said structure having in front of said annular surface a plurality of integral circumferentially spaced lug portions which extend radially inward to engage the front surfaces of respective of said arcuate portions of the dial so that said dial is clamped between said lug portions and said annular surface of the support structure, said dial being substantially flat and under compression when clamped between said lug portions and said annular surface, whereby end-play between said dial and support structure is substantially eliminated.

7. Apparatus according to claim 6 wherein said disc-like dial and said support structure has a circumferential lug portion which extends radially inward into said last-mentioned slot to prevent angular displacement of said dial in the support structure.

8. Apparatus according to claim 6 wherein said disc-like dial has an arcuate lug portion and the annular surface of said support structure has a slot provided therein for receiving the lug portion of the dial to prevent angular displacement of said dial in the support structure.

References Cited in the file of this patent
UNITED STATES PATENTS 1,021,888    Porter _____ Apr. 2, 1912

FOREIGN PATENTS 58,719    Switzerland _____ Feb. 12, 1912